March 7, 1933.  J. L. CREVELING  1,900,278
ELECTRIC SYSTEM
Filed May 24, 1920
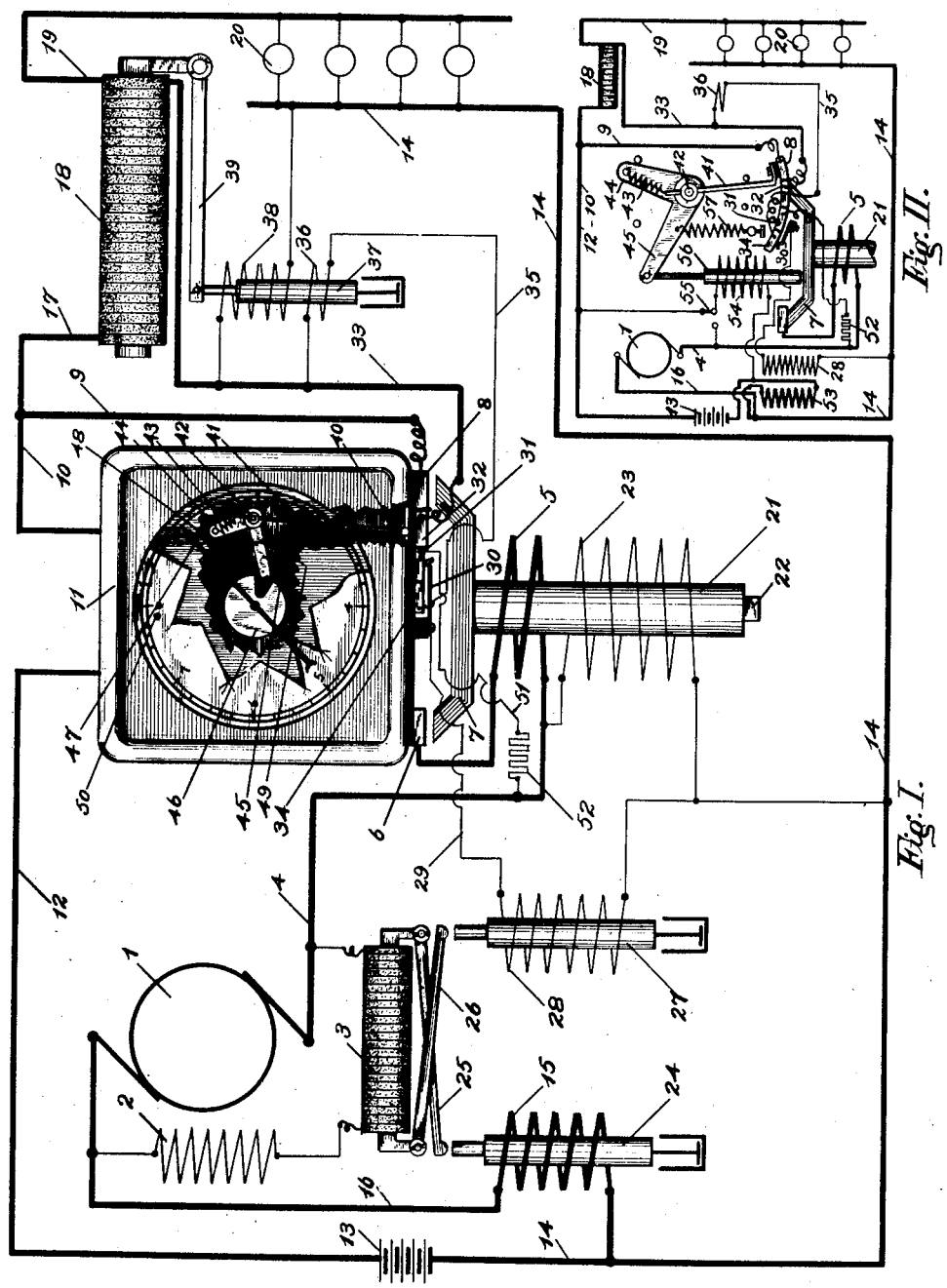
Fig. I.
Fig. II.
INVENTOR
John L. Creveling Patented Mar. 7, 1933

1,900,278

UNITED STATES PATENT OFFICE

JOHN L. CREVELING, OF TUCSON, ARIZONA, ASSIGNOR, BY MESNE ASSIGNMENTS, TO THE SIMPLEX EQUIPMENT COMPANY, INC., OF NEW YORK, N. Y., A CORPORATION OF DELAWARE

ELECTRIC SYSTEM

Application filed May 24, 1920. Serial No. 383,750.

My invention is particularly applicable to that class of electric systems wherein it is desired to operate lamps or other translating devices by means of a storage battery and a cooperating source of electrical potential difference and wherein the source at times supplies current to the battery and at times to the translating devices which are operated by the battery when the source is ineffective to supply the same.

As my invention is very suitable for the lighting of railway cars having a dynamo or generator driven by the axle of the car and, therefore, subjected to wide variations in speed and intermittent operation corresponding to the movement of the car, it will be described with particlular reference to such a system; but no means is shown for compensating for difference in direction of motion of the car as the particular means employed forms no part of my present invention and such devices are now well known in the art, which even contains many examples of driving means whereby the direction of rotation of the generator may remain constant regardless of the direction of movement of the car.

Fig. I is a diagrammatic representation of one type of system employing an embodiment of my invention; and Fig. II diagrammatically represents certain modifications which may be made in the system il'ustrated in Fig. I to produce a modified form of embodiment of my invention.

In the drawing, referring particularly to Fig. I, a source of electrical potential difference is indicated as a generator 1, provided with a field energizing coil 2, having in series therewith a suitable type of regulating device or element in this case indicated as a carbon pile 3. Therefore, the electrical operation of the source may be controlled by proper manipulation of the pressure upon the pile 3. The generator 1 has its positive lead 4 connected with one end of the coil or winding 5, the opposite end of which is connected with the contact member 6. The contact or bridge member 7 when raised is adapted to connect the member 6 with the contact member 8 when the same is in the position indicated in the drawing and the member 8 is in electrical connection, as by the lead 9, with the battery main 10 which is carried to one side of a suitable amperehour meter or quantitative measuring device 11, the opposite terminal of which is connected, as by the main 12, with the positive side of the storage battery 13, the negative side of which is connected with main 14 in communication with one end of the solenoid or winding 15, the opposite end of which is connected as by the lead 16 to the negative brush of the generator. The lead 9 is also connected, as by the translating circuit main 17, with one terminal of the translating circuit regulating device 18, in this instance indicated as a carbon pile having its opposite terminal connected, as by the main 19, with the positive terminals of the translating devices 20, the negative terminals of which are connected with the main 14 through which return is made to the generator. The switch member 7 is operated by the core 21 normally tending to rest upon the stop 22 and provided with a closing coil 23 across the generator as by connection with the positive lead 4 and the negative main 14, as indicated. The solenoid 15 is provided with a core 24 which it tends to raise when energized against the action of the dashpot indicated as cooperating therewith; and upward movement of the said core, by engaging the lever 25, may vary the pressure upon the pile 3 to regulate the generator 1, as downward movement of the lever 26 will be prevented as soon as the same comes into contact with the core 27 which is surrounded by the voltage coil 28 tending to lift the same when energized against the action of its cooperating dashpot, as indicated. The coil 28 has one of its terminals connected with the generator, as shown, by being in connection with the main 14. The opposite terminal is connected, as by wire 29, with the wiper 30 and adapted to cause electrical communication with the contact member 31 when said member is in the position shown in the drawing. The contact member 32 is connected, as by wire 33, with the translating circuit main 19, or as indicated, with the same portion or terminal of the translating circuit regulator as the said main. The contact member 34 is connected, by wire 35, with one end of the coil 36 surrounding the core 37 and having its opposite end connected with the lead 33. The core 37 is provided with a dashpot and is surrounded by the voltage coil 38 across the translating circuit, as indicated, and tending to raise the core 37, when energized, and so manipulate the lever 39 as to hold the voltage upon the translating circuit from exceeding a predetermined limit by operation of the regulating device or pile 18, in a well known manner. The contact members 8, 32, 31 and 34 are all electrically insulated but are mechanically connected with each other so as to be moved together by means of the pivotal connection at 40 with the lever 41 which lever is pivoted as at 42 and provided with an extension on the opposite side of the pivot engaging the compression spring 43, the opposite end of which is carried by the pin shown as carried by the extremity of the lever 44 which is united with the lever arm 45 to form a bell-crank lever pivoted also at 42. When the bell-crank lever 44—45 is in the position indicated in the drawing, spring 43 tends to swing the lever 41 in a clockwise direction and hold the contact members 8, 32, 31 and 34 in the position indicated in the drawing.

The meter 11 is provided with suitable operating mechanism as is now well understood in the art, and as the particular type of metering mechanism employed forms no part of my present invention the same is purposely omitted for the sake of brevity as it is only necessary, in the type of device chosen to illustrate my invention, that the metering mechanism shall rotate the disk 46 and indicating hand 47 in a counter-clockwise direction as current flows from the generator to the storage battery, and in the reverse direction when current flows from the battery to the translating devices. It will also, of course, be obvious that I may employ metering mechanism which will move the said disk 46 and hand 47 throughout a certain angular distance upon a certain amount of current being delivered to the battery, and the same angular motion in a clockwise direction when a lesser amount of current has been supplied by the battery, and wherein the relationship of these two values may be adjusted to compensate for the inefficiency of the battery, in a manner now well known in the art.

The lever 45 is provided with a small roller 48; and the springs 49, or any other type of suitable mechanism, tend to cause the roller 48 to move into the notched portion of the disk 46 when the notch registers with the roller 48, which roller is pressed against the disk 46 by the said springs 49, or other suitable means, when not registering with the notch, as will be more fully explained.

50 is a pin or stop limiting the movement of the hand 47 and the disk 46. The contact member 31 is connected, as by the wire 51 through a suitable resistance 52, with the lead 4.

In Fig. II like numerals indicate like parts and many of the details shown in Fig. I, which may be the same in the modification shown in Fig. II, are omitted for the sake of clearness, while some of the instrumentalities of Fig. I are shown in different forms to bring out modifications which may be made within the scope of my invention. Therefore, the description of Fig. II will be practically limited to such instrumentalities or features as differ from the precise arrangements of Fig. I to more specifically point out the particular features intended to be illustrated by Fig. II and which may be substituted in Fig. I, as may be desired.

The series coil 15 of Fig. I is omitted and the series coil 53 shown in its stead in series with the battery main 14 and, therefore, affected by the battery charging current instead of the total output of the generator, to point out that such arrangement of the coil may be used in any type of system employing my invention without causing a departure therefrom. The movable insulated contact members 8, 32, 31 and 34 are shown in segmental form and mechanically carried by the member 41 so as to have a circular movement around the pivot 42, instead of a horizontal movement, as indicated in Fig. I, to show that this type of arrangement may be used, if desired, in a structure employing my invention. The main switch is shown as closed with the member 7 connecting the member 6 with the segment 32 to illustrate the switch as closed and the contacts in their second operating conditions, as distinguished from the first operating conditions as shown in Fig. I, to indicate another phase of operation of a system employing my invention. The position of the contact members 8, 32, 31 and 34, in this modification, is illustrated as controlled by a voltage measuring means, indicated as a solenoid 54 across the battery or across the generator, as may be determined by the operation of the switch 55 instead of the amperehour meter 11 of Fig. I, the arrangement of the solenoid 54 being such that energization of the same tends to raise the core 56 and swing the lever 45 in a clockwise direction against the action of spring 57 tending to revolve the lever 45 in a counter-clockwise direction.

An operation of my invention is substantially as follows:

If the generator be at rest or running at sufficiently low speed and the other devices in the positions indicated in Fig. I of the drawing, the main switch will be open and the translating devices 20 may be supplied by the storage battery 13 through the main 12, meter 11, main 10—17, translating circuit regulator 18 and main 19, and return to the battery made through the main 14. The current thus supplied by the battery will revolve the disk 46 and hand 47 in a clockwise direction, and the amount taken from the battery may be indicated by the position of the hand 47. If the battery tend to operate the translating devices at a higher voltage than desired, coil 38 will raise the core 37 and, through the instrumentality of the lever 39, so operate the resistance element 18 as to prevent the proper translating circuit voltage from being exceeded. And, in practice, I prefer to use a regulator which is capable of holding the translating circuit voltage from varying within very narrow limits.

If, now, the generator voltage be brought up until equal to or slightly in excess of that of the storage battery, the current flowing from the positive lead 4 through winding 23 to the main 14 will cause the core 21 to be lifted and the member 7 will cause electrical connection between the contact members 6 and 8 and current will flow from the generator through lead 4, holding coil 5, contact 6, member 7, contact 8 and lead 9; and, if the voltage of the generator be sufficient, through main 17, regulator 18, lead 19, translating devices 20 to main 14; and also through main 10, meter 11, main 12, battery 13 to main 14, from which return to the generator will be made through coil 15 and lead 16. The translating circuit voltage will continue to be regulated, as above mentioned; and, as the voltage of the generator is increased, the current flowing to the battery will also increase. And I so arrange the coil 15 and the core 24 that, if a predetermined desired generator current tend to be exceeded, the coil 15 will lift the core 24 and raise the lever 25 and so regulate the pressure upon the pile 3 and the current in the field coil 2 that this desired maximum current will not be exceeded by the generator regardless of increases in speed thereof. The current supplied to the battery will cause the meter mechanism to rotate the disk 46 and hand 47 in a counter-clockwise direction, and the condition of charge of the battery may thus be indicated by the position of the said hand. And, in the system chosen for the illustration, the battery is taken as having received practically seven-eighths (⅞) of the full charge desired to have measured out as supplied to it, or as having delivered about one-eighth (⅛) of its normal charge to the translating devices; and, therefore, the mechanism is approaching the position that it should operate to cut off the charging current, which current, by revolving the disk 46 until the pointer 47 assumes a vertical position, will raise the pin or roller 48 and thereby swing the bell-crank lever 45—44 in a clockwise direction about the pivot 42 and cause the extremity of the spring 43, carried by the free end of the lever arm 44, to be moved in a right-hand direction beyond the line of the upper extremity of the lever 41; whereupon the spring 43 will tend to rotate the lever 41 in a counter-clockwise direction and thereby tend to shift the contact members 8, 32, 31 and 34 in a right-hand direction (which position of the said parts is illustrated in Fig. 2). But no motion will be given these contact members so long as the main switch remains closed, as they are held from movement by the member 7 pressing upon the contact member 8 and may be further restrained by extending the insulating material separating the members 8 and 32, as shown in the figure, or by any other suitable means.

If, now, the generator continue to run at sufficient speed, it will continue to charge the battery; but the disk 46 and the hand 47 will be restrained from rotating beyond the vertical position of the hand by the stop pin 50 indicating that the battery is charged, unless some other change of conditions be brought about in the system. While so running current will flow from the lead 4 through resistance 52, wire 51, contact member 31, wiper 30, wire 29 and coil 28 to main 14; and, therefore, the coil 28 will measure the voltage across the generator circuit and may have its effect varied by adjustment of the resistance 52. I so arrange the coil 28 and its core 27 that, in case the voltage measured by the said coil tend to increase beyond a predetermined limit, it will lift the core 27 and, by raising lever 26, so manipulate the regulating element 3 that this desired maximum voltage will not be exceeded by the generator.

With certain types of battery there is a considerable rise in terminal voltage upon charging after a desired condition of charge, which may be considered as a "normal full charge", has been reached. And, if the current supplied to the battery remain at the full value limited by the coil 15 after the indicator 47 reaches the vertical position, the voltage across the generator and battery will increase considerably. I can, therefore, so adjust the operation of the coil 28 that, when this rise tends to take place, the coil 28 will so affect the regulator 3 that further rise in generator voltage will be prevented. And, therefore, as the battery voltage tends to rise further, the current supplied thereto by the generator will taper off and approach zero; whereupon, if there be little or no load upon the translating circuit, the generator will substantially "float" across the line. Or I may so adjust the operation of the coil 28 that the full charging current, or a material portion thereof, will continue to be supplied to the storage battery even after the hand 47 indicates that the battery has received its desired full charge. And, with such an adjustment, the coil 28 will at any time prevent an excessive voltage across the generator, as for example in case it be running at operating speed and the battery circuit be open, as in the case of a broken battery main. With either adjustment of the operation of the coil 28, the first time the generator voltage falls sufficiently (as upon lessening of its speed) that the main switch opens, spring 43 will immediately rotate the lever 41 in a counter-clockwise direction and quickly move the contact members 8, 32, 31 and 34 in a right-hand direction; whereupon, if the generator voltage be increased again and the main switch closed, the member 7 will connect the generator with the contact member 32 which is connected directly by wire 33 with the translating main 19, thereby connecting the generator directly with the translating circuit.

The movement of the contact members 8, 32, 31 and 34 will cause the contact between the wiper 30 and the member 31 to be broken and contact between the wiper 30 and the member 34 to be established. And, therefore, coil 28 will now be in shunt across the translating circuit through wire 35 and coil 36. And I so arrange and adjust the coil 36 that its resistance will be sufficient, when in series with the coil 28, to so adjust the operation of the coil 28 that it will hold the desired translating circuit voltage from being exceeded by the generator, within vary narrow limits. And, therefore, when thus connected, the generator supplies current directly to the translating circuit at the desired translating circuit voltage value. Coil 36 is arranged to gently assist the coil 38; and, as the generator tends to increase the voltage upon the translating circuit, the current flowing through the coil 36 and assisting the coil 38 makes it possible for the coil 38 to operate the regulator 18 upon a slightly lower voltage than when the coil 38 is operating alone. And, therefore, the resistance 18 is operated to restrain the battery from materially discharging to the translating circuit so long as the generator maintains the proper translating circuit voltage upon the said circuit, even though the battery voltage may be considerably above that now maintained by the generator.

If, now, the generator voltage be lessened until insufficient to supply the total translating circuit current, the difference will be made up by the battery, and the battery discharge current passing through the meter 11 will cause the disk 46 and hand 47 to be rotated in a clockwise direction. And, if sufficient current be taken from the battery, the notched portion of the disk 46 will engage the roller 48 and revolve the bell-crank lever 45—44 in a counter-clockwise direction into the position shown in the drawing; whereupon the spring 43 will tend to move the contact members 8, 32, 31 and 34 into the position shown in the drawing. But the said members will be restrained from said movement so long as the main switch remains closed. However, if the voltage of the generator fall sufficiently that the main switch open, the said contact members will immediately assume the position shown in the drawing. And, therefore, as soon as the generator is brought up again to its proper charging voltage, it will be connected to the charging circuit and adjusted to deliver a charging current and go through the cycle of operation as first above outlined. Should the voltage of the generator remain sufficiently low that the main switch remain open for a considerable time and considerable current be drawn from the battery, the disk 46 and hand 47 will continue to rotate in a clockwise direction and measure the current drawn from the battery, which will be indicated by the hand 47. And during such time the roller 48 will be held in contact with the disk 46 ready to drop into the notched portion again when the disk 46 is rotated in a counter-clockwise direction by the charging current, and thus cause engagement to operate the lever 45, as mentioned above, when the battery has again received a chosen charging current adjusted to be that sufficient to make up for the amount taken therefrom. And when the meter has again measured this value of charging current, it will again cause the mechanism operated thereby to shift the connection of the generator from the battery circuit to the translating circuit upon the first opening of the main switch, as above described.

An operation of that modification intended to be brought out in Fig. II is, in main, substantially the same as that outlined above with regards Fig. I. However, coil 53 operates the core 24 to prevent a desired battery charging current from being exceeded, instead of a desired total current as limited by the coil 15. And instead of an amperehour meter there is shown employed a voltage responsive coil 54 which may be either in shunt across the battery, as shown, or, by proper manipulation of the switch 55, in shunt across the generator, the latter connection being provided for testing and adjusting the operation of said coil, as will be understood by those skilled in the art. When this arrangement is used and the meter dispensed with, I usually prefer to so adjust the operation of the coil 28 that when the generator is connected with the battery charging circuit the coil 28 will not affect the generator unless a voltage value be reached somewhat in excess of that desired to hold across the battery at any time under normal conditions of operation. Therefore, the coil 28 will serve at any time to prevent an excessive voltage, as for example one that might injure some portion of the system in case of a broken battery lead or increase of resistance in the battery circuit but will not interfere with the following operation of the coil 54. I so adjust the operation of the coil 54 that when the charging voltage impressed upon the battery tends to increase abruptly, as above mentioned with respect to the operation of Fig. I, as indicating the approach of a fully charged state, the said coil 54 will raise the core 56 and bellcrank lever 45—44 into the positions shown in Fig. II; whereupon, at the first opening of the main switch, if the battery voltage remains such as to indicate a full charge, the lever 41 will assume the position shown in the drawing and the next closing of the main switch will establish the connections illustrated, for the purposes explained with respect to Fig. I. And, if the battery be discharged down to that point that its voltage reach a predetermined value at which it is desired it should again be charged, coil 54 will allow the spring 57 to swing the lever 45 downwardly and bring the lever 44 in contact with its left-hand stop, whereupon the spring 43 will tend to rotate the lever 41 in a clockwise direction. And, upon the next opening of the main switch, the lever 41 will be quickly snapped against its left stop and the contact members 8, 32, 31 and 34 brought into the positions shown in Fig. I. When the switch closes again the generator will be connected directly to the charging circuit and will charge the battery until its voltage is again brought up to that value chosen to operate the core 56 and again hold the same in the position shown in Fig. II, whereupon the next cycle of opening and closing of the main switch will cause the generator to again be connected directly to the translating circuit and operate as above pointed out with respect to Fig. I when such connections were established.

From the above it will be seen that I have produced a system wherein the device for measuring the condition of charge of the storage battery, whether it be an amperehour meter or a voltage measuring coil or other instrumentality, causes the generator to be connected with the charging circuit to charge the battery and furnish current to the translating devices or directly with the translating circuit simply to supply the same when the battery is charged by means of simple and inexpensive instrumentalities utilizing the operation of the main switch to assist in their operation and avoid the necessity of other instrumentalities for performing the functions thus accomplished by the main switch itself.

And it will be noted that my invention is therefore particularly applicable to the lighting of railway cars by a generator driven from the axle as the fall in voltage of the generator upon slowing down and upon stops causes the main switch to open frequently and allows the measuring means to shift the connections at intervals of required frequency.

And as many of the systems now in use contain a regulator for the generator automatically controlled, as for example in response to voltage and current fluctuations, and also a main switch having a movable member corresponding to that illustrated at 7, I can readily embody the elements of my invention in such existing systems by adding a self-contained measuring device of any suitable type indicating the condition of charge and discharge of the battery which has merely to shift the connections indicated as operated by the lever 41 under proper conditions of operation, as above outlined, to produce the desired results.

It will also be noted that I have produced a very simple means whereby the voltage regulator for the generator and the voltage regulator for the translating circuit cooperate to shift the regulation from one to the other, under proper conditions, with very little, if any, change in translating circuit voltage, whether it be supplied from the battery circuit or directly by the generator.

I do not wish in any way to limit myself to the exact constructions indicated in this specification nor to the exact modes of operation above outlined which are given to illustrate embodiments of my invention, for it will be obvious that wide departure in details of construction and operation may be made without departing from the spirit and scope of my invention, which is as set forth in the following claims:

1. The combination with a source of electrical potential difference, a storage battery circuit and a translating circuit, of an automatic switch for connecting and disconnecting the source therewith comprehending means whereby said switch connects the source with the battery circuit under certain conditions and with the translating circuit under other conditions comprising means for determining which connection shall be made operated by current supplied to the battery.

2. The combination with a source of electrical potential difference, a storage battery circuit and a translating circuit, of an automatic switch for connecting and disconnecting the source therewith comprehending means whereby said switch connects the source with the battery circuit under certain conditions and with the translating circuit under other conditions comprising means for determining which connection shall be made operated by current supplied by the battery.

3. The combination with a source of electrical potential difference, a storage battery circuit and a translating circuit, of an automatic switch for connecting and disconnecting the source therewith comprehending means whereby said switch connects the source with the battery circuit under certain conditions and with the translating circuit under other conditions comprising means for determining which connection shall be made operated by current supplied to and by the battery.

4. The combination with a source of variable electrical potential difference, a storage battery circuit and a translating circuit, of automatic means adapted to connect the source with one of said circuits when the potential difference reaches a predetermined value, and means operated by current supplied to the battery mechanically affecting said first mentioned means to determine with which circuit connection shall be made.

5. The combination with a source of variable electrical potential difference, a storage battery circuit and a translating circuit, of automatic means adapted to connect the source with one of said circuits when the potential difference reaches a predetermined value, and means operated by current supplied by the battery mechanically affecting said first mentioned means to determine with which circuit connection shall be made.

6. The combination with a source of variable electrical potential difference, a storage battery circuit and a translating circuit, of automatic means adapted to connect the source with one of said circuits when the potential difference reaches a predetermined value, and means operated by current supplied to and by the battery mechanically affecting said first mentioned means to determine with which circuit connection shall be made.

7. The combination with a variable source of electrical potential difference, a storage battery charged thereby, a translating circuit deriving current from the battery and the source and a regulating device connecting the battery circuit with the translating circuit, of an automatic switch comprehending in its structure means for operating the same when the potential difference of the source reaches a predetermined value and to connect the source selectively on opposite sides of said regulating device, movable means determining which of said connections shall be made by said switch upon its closure, and means operated by the current supplied to the battery for moving said movable means.

8. The combination with a variable source of electrical potential difference, a storage battery charged thereby, a translating circuit deriving current from the battery and the source and a regulating device connecting the battery circuit with the translating circuit, of an automatic switch comprehending in its structure means for operating the same when the potential difference of the source reaches a predetermined value and to connect the source selectively on opposite sides of said regulating device, movable means determining which of said connections shall be made by said switch upon its closure, and means operated by the current supplied by the battery for moving said movable means.

9. The combination with a variable source of electrical potential difference, a storage battery charged thereby, a translating circuit deriving current from the battery and the source and a regulating device connecting the battery circuit with the translating circuit, of an automatic switch comprehending in its structure means for operating the same when the potential difference of the source reaches a predetermined value and to connect the source selectively on opposite sides of said regulating device, movable means determining which of said connections shall be made by said switch upon its closure, and means operated by the current supplied to and by the battery for moving said movable means.

10. The combination with a variable speed dynamo, a storage battery circuit and a translating circuit connected together through a regulating device, and an automatic switch adapted to connect the dynamo with one of said circuits when its voltage reaches a predetermined value and to disconnect the dynamo when its voltage falls below a predetermined value, of movable contacting means cooperating with said switch whereby it connects the dynamo on one side of said regulating device under certain conditions and on the other side under other conditions, and means operated by current supplied to the battery for moving said movable means to govern said conditions.

11. The combination with a variable speed dynamo, a storage battery circuit and a translating circuit connected together through a regulating device, and an automatic switch adapted to connect the dynamo with one of said circuits when its voltage reaches a predetermined value and to disconnect the dynamo when its voltage falls below a predetermined value, of movable contacting means cooperating with said switch whereby it connects the dynamo on one side of said regulating device under certain conditions and on the other side under other conditions, and means operated by current supplied by the battery for moving said movable means to govern said conditions.

12. The combination with a variable speed dynamo, a storage battery circuit and a translating circuit connected together through a regulating device, and an automatic switch adapted to connect the dynamo with one of said circuits when its voltage reaches a predetermined value and to disconnect the dynamo when its voltage falls below a predetermined value, of movable contacting means cooperating with said switch whereby it connects the dynamo on one side of said regulating device under certain conditions and on the other side under other conditions, and means operated by current supplied to and by the battery for moving said movable means to govern said conditions.

13. The combination with a source of electrical potential difference tending to vary, a storage battery circuit and a translating circuit, automatic means for connecting the source under certain conditions with the battery circuit, current responsive means adapted to control the source when so connected, voltage responsive means normally ineffective during a substantial portion of the charging period of the battery and adapted to prevent material increase in voltage at the source above that sufficient to charge the battery, means for causing the automatic means under certain conditions to connect the source with the translating circuit, and means for rendering the voltage responsive means effective to regulate the source to hold the voltage impressed upon the translating circuit substantially constant when so connected, said means being operated by current supplied to the battery.

14. The combination with a source of electrical potential difference tending to vary, a storage battery circuit and a translating circuit, automatic means for connecting the source under certain conditions with the battery circuit, current responsive means adapted to control the source when so connected, voltage responsive means normally ineffective during a substantial portion of the charging period of the battery and adapted to prevent material increase in voltage at the source above that sufficient to charge the battery, means for causing the automatic means under certain conditions to connect the source with the translating circuit, and means for rendering the voltage responsive means effective to regulate the source to hold the voltage impressed upon the translating circuit substantially constant when so connected, said means being operated by current supplied by the battery.

15. The combination with a source of electrical potential difference tending to vary, a storage battery circuit and a translating circuit, automatic means for connecting the source under certain conditions with the battery circuit, current responsive means adapted to control the source when so connected, voltage responsive means normally ineffective during a substantial portion of the charging period of the battery and adapted to prevent material increase in voltage at the source above that sufficient to charge the battery, means for causing the automatic means under certain conditions to connect the source with the translating circuit, and means for rendering the voltage responsive means effective to regulate the source to hold the voltage impressed upon the translating circuit substantially constant when so connected, said means being operated by current supplied to and by the battery.

16. The combination with a source of electrical potential difference, regulating means therefor, a storage battery circuit and a translating circuit, of automatic means for connecting the source with the battery circuit under certain conditions and with the translating circuit under other conditions, movable means determining which connection shall be made and operated by current supplied to the battery, and means for altering the adjustment of the regulating means operated thereby.

17. The combination with a source of electrical potential difference, regulating means therefor, a storage battery circuit and a translating circuit, of automatic means for connecting the source with the battery circuit under certain conditions and with the translating circuit under other conditions, movable means determining which connection shall be made and operated by current applied by the battery, and means for altering the adjustment of the regulating means operated thereby.

18. The combination with a source of electrical potential difference, regulating means therefor, a storage battery circuit and a translating circuit, of automatic means for connecting the source with the battery circuit under certain conditions and with the translating circuit under other conditions, movable means determining which connection shall be made and operated by current supplied to and by the battery, and means for altering the adjustment of the regulating means operated thereby.

19. The combination with a source of electrical potential difference tending to vary, a storage battery circuit and a translating circuit, of automatic means for connecting the source with the battery circuit under certain conditions and with the translating circuit under other conditions, automatic regulating means for controlling the source responsive to voltage fluctuations, automatic means for connecting the regulating means with the battery circuit under certain conditions and with the translating circuit under other conditions, said automatic means being operated by current supplied to the battery.

20. The combination with a source of electrical potential difference tending to vary, a storage battery circuit and a translating circuit, of automatic means for connecting the source with the battery circuit under certain conditions and with the translating circuit under other conditions, automatic regulating means for controlling the source responsive to voltage fluctuations, automatic means for connecting the regulating means with the battery circuit under certain conditions and with the translating circuit under other conditions, said automatic means being operated by current supplied by the battery.

21. The combination with a source of electrical potential difference tending to vary, a storage battery circuit and a translating circuit, of automatic means for connecting the source with the battery circuit under certain conditions and with the translating circuit under other conditions, automatic regulating means for controlling the source responsive to voltage fluctuations, automatic means for connecting the regulating means with the battery circuit under certain conditions and with the translating circuit under other conditions, said automatic means being operated by current supplied to and by the battery.

22. The combination with a source of electrical potential difference tending to vary, a storage battery circuit and a translating circuit, of automatic means for connecting the source with the battery circuit under certain conditions and with the translating circuit under other conditions, automatic voltage responsive regulating means for controlling the source, automatic means for connecting the responsive means with the battery circuit under certain conditions and with the translating circuit under other conditions, and means for altering the resistance in circuit with the responsive means depending upon which circuit it is connected with.

23. The combination with a variable speed generator, a storage battery charged thereby, automatic means for stopping the charging thereof, current responsive means limiting the output of the generator, voltage responsive means controlling the generator to limit the voltage supplied thereby, and means for altering the operative relation of said voltage responsive means, operated by current supplied to the battery.

24. The combination with a variable speed generator, a storage battery charged thereby, automatic means for stopping the charging thereof, current responsive means limiting the output of the generator, voltage responsive means controlling the generator to limit the voltage supplied thereby, and means for altering the operative relation of said voltage responsive means, operated by current supplied by the battery.

25. The combination with a variable speed generator, a storage battery charged thereby, automatic means for stopping the charging thereof, current responsive means limiting the output of the generator, voltage responsive means controlling the generator to limit the voltage supplied thereby, and means for altering the operative relation of said voltage responsive means, operated by current supplied to and by the battery.

26. The combination with a source of electrical potential difference tending to vary and a plurality of circuits adapted to be supplied thereby, of an automatic switch for connecting said source singly with said circuits including automatic means cooperating therewith to select the circuit to be connected with said source and comprehending movable contact members the positions of which with respect to said switch are altered by current supplied to the battery.

27. The combination with a source of electrical potential difference tending to vary and a plurality of circuits adapted to be supplied thereby, of an automatic switch for connecting said source singly with said circuits including automatic means cooperating therewith to select the circuit to be connected with said source and comprehending movable contact members the positions of which with respect to said switch are altered by current supplied by the battery.

28. The combination with a source of electrical potential difference tending to vary and a plurality of circuits adapted to be supplied thereby, of an automatic switch for connecting said source singly with said circuits including automatic means cooperating therewith to select the circuit to be connected with said source and comprehending movable contact members the positions of which with respect to said switch are altered by current supplied to and by the battery.

29. The combination with a source of electrical potential difference tending to vary, a storage battery circuit and a translating circuit, of automatic means for connecting the source with the battery circuit under certain conditions and with the translating circuit under other conditions, automatic means for regulating the voltage upon the translating circuit, means for affecting the operation thereof, and means for controlling said affecting means operated by current supplied to the battery.

30. The combination with a source of electrical potential difference tending to vary, a storage battery circuit and a translating circuit, of automatic means for connecting the source with the battery circuit under certain conditions and with the translating circuit under other conditions, automatic means for regulating the voltage upon the translating circuit, means for affecting the operation thereof, and means for controlling said affecting means operated by current supplied by the battery.

31. The combination with a source of electrical potential difference tending to vary, a storage battery circuit and a translating circuit, of automatic means for connecting the source with the battery circuit under certain conditions and with the translating circuit under other conditions, automatic means for regulating the voltage upon the translating circuit, means for affecting the operation thereof, and means for controlling said affecting means operated by current supplied to and by the battery.

32. The combination with a storage battery, a translating circuit and means for connecting said battery with said circuit including a regulator for affecting the voltage upon the translating circuit, and a source of electrical potential difference tending to vary, of automatic means controlling the connection of the source comprising means for connecting the source with the battery on one side of the regulator and with the translating circuit on the other side of said regulator, and means for measuring a variable quantity affected by the condition of charge and discharge of the battery and operating the connecting means to select which connection shall be made by said switch in accordance with the condition of charge of the battery as indicated by said measuring means.

33. The combination with a storage battery, a translating circuit and means for connecting said battery with said circuit including a regulator for affecting the voltage upon the translating circuit and a source of electrical potential difference tending to vary, of automatic means controlling the connection of the source comprising means for connecting the source with the battery on one side of the regulator and with the translating circuit on the other side of said regulator, and means for measuring a variable quantity affected by the condition of charge and discharge of the battery and operating the connecting means to select which connection shall be made by said switch in accordance with the condition of charge of the battery as indicated by said measuring means combined with voltage responsive means for controlling said source, and means operated by said measuring means for connecting the responsive means on opposite sides of said regulator.

34. The combination with a storage battery, a translating circuit and means for connecting said battery with said circuit including a regulator for affecting the voltage upon the translating circuit and a source of electrical potential difference tending to vary, of automatic means controlling the connection of the source comprising means for connecting the source with the battery on one side of the regulator and with the translating circuit on the other side of said regulator, and means for measuring a variable quantity affected by the condition of charge and discharge of the battery and operating the connecting means to select which connection shall be made by said switch in accordance with the condition of charge of the battery as indicated by said measuring means combined with voltage responsive means for controlling said source and means operated by said measuring means for connecting the responsive means on opposite sides of said regulator and simultaneously altering the standard of operation of said responsive means in accordance with which connection is made.

35. The combination with a storage battery, a translating circuit and means for connecting said battery with said circuit including a regulator for affecting the voltage upon the translating circuit and a source of electrical potential difference tending to vary, of automatic means controlling the connection of the source comprising means for connecting the source with the battery on one side of the regulator and with the translating circuit on the other side of said regulator, and means for measuring a variable quantity affected by the condition of charge and discharge of the battery and operating the connecting means to select which connection shall be made by said switch in accordance with the condition of charge of the battery as indicated by said measuring means combined with voltage responsive means for controlling said source and means operated by said measuring means for connecting the responsive means on opposite sides of said regulator and simultaneously altering the standard of operation of said responsive means and affecting said regulator.

36. The combination with a generator and a battery adapted to be charged thereby, of a regulator for the generator including a shunt coil responsive to generator voltage and operative to maintain substantial constancy of the generator voltage in spite of speed changes, and means operative to affect said shunt coil for establishing the generator voltage constancy to be maintained by the latter, but thus operative only while the generator voltage is below a preselected value.

37. The combination with a generator having a shunt field, a battery adapted to be charged thereby, of an external regulator for the generator including a shunt coil responsive to generator voltage and operative to maintain substantial constancy of generator voltage in spite of speed changes, and supplemental means operative to affect said shunt coil for establishing the generator voltage constancy to be maintained by the latter, but thus operative only while the generator voltage is below a preselected value.

38. The combination with a variable speed generator, a battery adapted to be charged thereby and lamps adapted to be supplied by the generator or by the battery, of a regulator for the generator including a shunt coil responsive to generator voltage and operative to maintain substantial constancy of generator voltage in spite of speed changes and independently of the state of charge of the battery through a predetermined range, and supplemental means operative at recurring intervals but only while the generator voltage is below a pre-selected value to affect the action of said shunt coil for establishing the generator voltage constancy to be maintained during a subsequent regulating effectiveness of the latter.

39. The combination with a variable speed generator having a shunt field, a battery adapted to be charged thereby and lamps adapted to be supplied by the generator or by the battery, of an external regulator operative to vary the strength of the generator field and including electro-responsive means influenced by a function of the generator output to maintain said output substantially constant in spite of speed changes but variable in accordance with battery condition changes, and electro-responsive means influenced only by a function of the battery to establish the value of the generator output to be maintained, as stated, by said first-mentioned means.

40. In a car lighting system, in combination, an axle-driven generator, a battery adapted to be charged thereby, a regulator to control the generator output, and means effective only when said regulator is relatively ineffective to govern the action of said regulator in accordance with the charging capacity of said battery.

41. In a car lighting system, in combination, an axle-driven generator, a battery adapted to be charged thereby, an electro-responsive regulator to control the generator in accordance with the relative normal state of charge of the battery, and automatic means operative only during regulating ineffectiveness of said regulator to establish the standard of subsequent effectiveness thereof in accordance with the actual capacity for charge of the battery.

42. In a system of electrical distribution, in combination, a variable speed generator and a battery connected to be charged thereby, means for regulating a function of the generator output to a predetermined standard irrespective of the generator speed, and means operative only when the generator voltage is below a predetermined value for establishing the setting of said regulating means.

43. The combination with a variable speed generator and a regulator therefor comprehending voltage-responsive operating means, of means for affecting the operation standard of said regulator and operating only when the said regulator is ineffective.

44. The combination with a variable speed generator, a circuit supplied thereby and a regulator for said generator, of means for operating said regulator responsive to voltage fluctuations across said circuit and automatic means for affecting the standard of operation of said responsive means and operated only at such times as the responsive means is substantially ineffective.

45. The combination with a variable speed generator, a regulating element for controlling the same and a voltage responsive coil across said generator for operating said element, of a means for adjusting the standard of operation of said coil thus operating only while the output of the generator is below a predetermined value.

46. The combination with a variable speed generator, a storage battery charged thereby and a voltage responsive regulator for the generator controlling the voltage impressed thereby upon the storage battery and means for adjusting the voltage held upon the battery by said regulator operating to perform such adjustment only when the output of the generator is below a predetermined value.

47. The combination with a variable speed generator, a storage battery supplied thereby and a voltage operated regulator for controlling the generator by limiting the voltage impressed across the battery thereby, of an electro-responsive device and means whereby the same alters the standard of voltage maintained across the battery by said voltage regulator only when the current output of the generator is below a predetermined value.

48. The combination with a variable speed generator, a regulating element for controlling the same and a voltage responsive coil across said generator for operating said element, of means for controlling the standard of voltage required to cause said coil to operate said element and thus operating only while the output of the generator is below a predetermined standard.

49. The combination with a variable speed generator, a storage battery charged thereby and a voltage responsive regulator for the generator controlling the voltage impressed thereby upon the storage battery and a means for adjusting the voltage to be held upon the battery by said regulator operating to perform such adjustments only when the activity of the generator is below a predetermined value.

50. The combination with a source of electrical potential difference tending to vary, a storage battery circuit and a translating circuit, automatic means for connecting the source with the battery circuit, current responsive means adapted to control the source when so connected, voltage responsive means normally ineffective during the charging of the battery and adapted to prevent material increase in voltage at the source above that sufficient to charge the battery, means for causing the automatic means under certain conditions to connect the source with the translating circuit and means cooperating therewith to render the voltage responsive means effective to regulate the source to hold the voltage impressed upon the translating circuit substantially constant when so connected, said means being operated in accordance with the state of charge of the storage battery.

51. The combination with a source of electrical potential difference tending to vary, a storage battery circuit and a translating circuit, automatic means for connecting the source with the battery circuit, current responsive means adapted to control the source when so connected, voltage responsive means normally ineffective during the charging of the battery and adapted to prevent material increase in voltage at the source above that sufficient to charge the battery, means for causing the automatic means under certain conditions to connect the source with the translating circuit and means cooperating therewith to render the voltage responsive means effective to regulate the source to hold the voltage impressed upon the translating circuit substantially constant when so connected, said means being operated in accordance with the current supplied to the storage battery.

52. The combination with a source of electrical potential difference tending to vary, a storage battery circuit and a translating circuit, automatic means for connecting the source with the battery circuit, current responsive means adapted to control the source when so connected, voltage responsive means normally ineffective during the charging of the battery and adapted to prevent material increase in voltage at the source above that sufficient to charge the battery, means for causing the automatic means under certain conditions to connect the source with the translating circuit and means cooperating therewith to render the voltage responsive means effective to regulate the source to hold the voltage impressed upon the translating circuit substantially constant when so connected, said means being operated in accordance with the current supplied by the battery.

53. The combination with a source of electrical potential difference tending to vary, a storage battery circuit and a translating circuit, automatic means for connecting the source with the battery circuit, current responsive means adapted to control the source when so connected, voltage responsive means normally ineffective during the charging of the battery and adapted to prevent material increase in voltage at the source above that sufficient to charge the battery, means for causing the automatic means under certain conditions to connect the source with the translating circuit and means cooperating therewith to render the voltage responsive means effective to regulate the source to hold the voltage impressed upon the translating circuit substantially constant when so connected, said means being operated in accordance with the current supplied to and by the battery.

54. The combination with a source of electrical potential difference, a storage battery circuit and a translating circuit, of automatic means for connecting the source with the battery circuit under certain conditions and with the translating circuit under other conditions, regulating means for the translating circuit, and means for altering the adjustment of said regulating means operated by said automatic means.

55. The combination with a source of electrical potential difference, a storage battery circuit and a translating circuit, of automatic means for conecting the source with the battery circuit under certain conditions and with the translating circuit under other conditions, regulating means for the translating circuit, and means for altering the adjustment of said regulating means operated by said automatic means comprehending a voltage coil affecting said regulating means, and means for controlling the connection of said coil affected by said automatic means.

56. The combination with a source of electrical potential difference tending to vary, a storage battery circuit and a translating circuit, of automatic means for connecting the source with the battery circuit under certain conditions and with the translating circuit under other conditions, automatic regulating means for controlling the source responsive to voltage fluctuations, and automatic means for connecting the responsive means with the battery circuit under certain conditions and with the translating circuit under other conditions.

57. The combination with a source of electrical potential difference tending to vary, a storage battery circuit and a translating circuit, of automatic means for conecting the source with the battery circuit under certain conditions and with the translating circuit under other conditions, automatic regulating means for controlling the source responsive to voltage fluctuations, and automatic means for connecting the responsive means with the battery circuit under certain conditions and with the translating circuit under other contions depending upon which circuit the source is connected with.

58. The combination with a source of electrical potential difference tending to vary, a storage battery circuit and a translating circuit, of automatic means for connecting the source with the battery circuit under certain conditions and with the translating circuit under other conditions, automatic regulating means for controlling the source responsive to voltage fluctuations, and automatic means for connecting the responsive means with the battery circuit under certain conditions and with the translating circuit under other conditions depending upon the state of charge of the battery.

59. The combination with a source of electrical potential difference tending to vary, a storage battery circuit and a translating circuit, of automatic means for connecting the source with the battery circuit under certain conditions and with the translating circuit under other conditions, automatic regulating means for controlling the source responsive to voltage fluctuations, and automatic means for connecting the responsive means with the battery circuit under certain conditions and with the translating circuit under other conditions depending upon the current supplied to the battery.

60. The combination with a source of electrical potential difference tending to vary, a storage battery circuit and a translating circuit, of automatic means for connecting the source with the battery circuit under certain conditions and with the translating circuit under other conditions, automatic regulating means for controlling the source responsive to voltage fluctuations, and automatic means for connecting the responsive means with the battery circuit under certain conditions and with the translating circuit under other conditions depending upon the current supplied by the battery.

61. The combination with a source of electrical potential difference tending to vary, a storage battery circuit and a translating circuit, of automatic means for connecting the source with the battery circuit under certain conditions and with the translating circuit under other conditions, automatic regulating means for controlling the source responsive to voltage fluctuations, and automatic means for connecting the responsive means with the battery circuit under certain conditions and with the translating circuit under other conditions depending upon the current supplied to and by the battery.

62. The combination with a source of electrical potential difference tending to vary, a storage battery circuit and a translating circuit, of automatic means for connecting the source with the battery circuit under certain conditions and with the translating circuit under other conditions, automatic regulating means for controlling the source responsive to voltage fluctuations, and automatic means for connecting the responsive means with the battery circuit under certain conditions and with the translating circuit under other conditions and altering the adjustment of said responsive means depending upon which circuit the same is connected with.

63. The combination with a source of electrical potential difference tending to vary, a storage battery circuit and a translating circuit, of automatic means for connecting the source with the battery circuit under certain conditions and with the translating circuit under other conditions, automatic regulating means for controlling the source responsive to voltage fluctuations and automatic means for connecting the responsive means with the battery circuit under certain conditions and with the translating circuit under other conditions and altering the adjustment of said responsive means depending upon the state of charge of the battery.

64. The combination with a source of electrical potential difference tending to vary, a storage battery circuit and a translating circuit, of automatic means for connecting the source with the battery circuit under certain conditions and with the translating circuit under other conditions, automatic regulating means for controlling the source responsive to voltage fluctuations, and automatic means for connecting the responsive means with the battery circuit under certain conditions and with the translating circuit under other conditions and altering the adjustment of said responsive means depending upon the current supplied to the battery.

65. The combination with a source of electrical potential difference tending to vary, a storage battery circuit and a translating circuit, of automatic means for connecting the source with the battery circuit under certain conditions and with the translating circuit under other conditions, automatic regulating means for controlling the source responsive to voltage fluctuations, and automatic means for connecting the responsive means with the battery circuit under certain conditions and with the translating circuit under other conditions and altering the adjustment of said responsive means depending upon the current supplied by the battery.

66. The combination with a source of electrical potential difference tending to vary, a storage battery circuit and a translating circuit, of automatic means for connecting the source with the battery circuit under certain conditions and with the translating circuit under other conditions, automatic regulating means for controlling the source responsive to voltage fluctuations, and automatic means for connecting the responsive means with the battery circuit under certain conditions and with the translating circuit under other conditions and altering the adjustment of said responsive means depending upon the current supplied to and by the battery.

67. The combination with a variable speed generator, a storage battery charged thereby, current responsive means controlling the output of the generator, voltage responsive means for independently controlling the generator to limit the voltage supplied thereby, and means acting upon the voltage responsive means for altering the adjustment and shifting the point of operative connection of said voltage responsive means affected by the state of charge of the battery.

68. The combination with a variable speed generator, a storage battery charged thereby, current responsive means controlling the output of the generator, voltage responsive means for independently controlling the generator to limit the voltage supplied thereby, and means acting upon the voltage responsive means for altering the adjustment and shifting the point of operative connection of said voltage responsive means affected by the current supplied to the battery.

69. The combination with a variable speed generator, a storage battery charged thereby, current responsive means controlling the output of the generator, voltage responsive means for independently controlling the generator to limit the voltage supplied thereby, and means acting upon the voltage responsive means for altering the adjustment and shifting the point of operative connection of said voltage responsive means affected by the current supplied by the battery.

70. The combination with a variable speed generator, a storage battery charged thereby, current responsive means controlling the output of the generator, voltage responsive means for independently controlling the generator to limit the voltage supplied thereby, and means acting upon the voltage responsive means for altering the adjustment and shifting the point of operative connection of said voltage responsive means affected by the current supplied to and by the battery.

71. The combination with a variable speed generator and automatic regulating means adapted to control the same as against speed changes, of electro-responsive means for affecting the action of said regulating means operative only during ineffectiveness of said regulating means.

72. The combination with a variable speed generator, regulating means adapted to control the same and voltage-responsive means for operating said regulating means, of electro-responsive means affecting the action of said regulating means operating only during relative ineffectiveness of said voltage-responsive means.

73. The combination with a variable speed generator and regulating means adapted to automatically control the same when a certain voltage is reached, of electro-responsive means adapted to affect the operation of the regulating means and to come into action only when the regulating means is relatively ineffective.

74. The combination with a variable speed generator and regulating means the operation of which affects said generator of voltage-responsive means adapted to affect the regulating means and voltage-responsive means adapted to affect the operation of said regulating means and to come into operation only during relative ineffectiveness of said first-named voltage-responsive means.

75. The combination with a variable speed generator, a battery charged thereby and regulating means adapted to automatically affect the operation of said generator in response to voltage fluctuations when above a certain value, of voltage-responsive means affecting the operation of said regulating means adapted to come into operation only when the regulating means is relatively ineffective in the control of the generator voltage.

76. The combination with a variable speed generator, a battery charged thereby and voltage-responsive regulating means for automatically controlling the generator under certain conditions, of a frictionally affected device for affecting said regulating means, and voltage-responsive means for operating said frictional device.

77. The combination with a variable speed generator and regulating means adapted to automatically affect the same when a certain voltage is reached, of electro-responsive means adapted to affect the operation of the regulating means comprehending frictionally controlled mechanism and means for automatically operating same at a voltage below that necessary to operate the aforesaid regulating means.

78. The combination with a variable speed generator and regulating means adapted to automatically control the same when a certain voltage is reached, of electroresponsive means adapted to affect the operation of the regulating means and to come into action at a voltage below that necessary to operate the aforesaid regulating means.

79. The combination with a variable speed generator and a regulator therefor comprehending electroresponsive operating means, of means for affecting the responsiveness of said regulator and operating only when the said regulator is relatively ineffective.

80. The combination with a variable speed generator, a circuit supplied thereby and a regulator for said generator, of means for operating said regulator responsive to voltage fluctuations across said circuit and automatic means for affecting the operativeness of said responsive means and operated only at such times as the responsive means is ineffective.

81. In an electrical system of distribution, in combination, a generator, a battery adapted to be charged thereby, regulating means for said generator including an electroresponsive coil influenced by a function of the generator output, and means automatically operative at intervals independent of the stage of battery charge to vary the electrical responsiveness of said coil depending upon the capacity of said battery to be charged.

82. In a car lighting system, in combination, a variable speed generator, a battery adapted to be charged thereby, regulating means to control said generator as against speed changes, means to govern the action of said first-mentioned means, and means to permit the effectiveness of said second-mentioned means only during the period of ineffectiveness of said first-mentioned means.

83. The combination with a generator and a regulator comprehending electroresponsive operating means, of means for affecting the operation of said regulator, means tending to operate the said means and means preventing the operation thereof while the regulator is effective.

84. The combination with a generator and a regulator comprehending electro-responsive operating means, of means for affecting the operation of said regulator, means tending to operate the said means and means preventing the operation thereof while the regulator is effective and permitting operation thereof at times while the regulator is ineffective.

85. The combination with a generator and a regulator therefor comprehending electro-responsive operating means, of means for affecting the operation of said regulator and means preventing the operation of said last-named means while the generator output is above a predetermined value.

86. The combination with a generator and a regulator therefor comprehending electro-responsive operating means, of means for affecting the operation of said regulator including a coil and means for controlling the energization of said coil operating only when the regulator is ineffective.

87. The combination with a generator and a regulator comprehending electro-responsive operating means, of means for affecting the operation of said responsive means, means tending to operate the said affecting means and means preventing the operation thereof while the regulator is effective.

88. The combination with a generator and a regulator comprehending electro-responsive operating means, of means for affecting the operation of said responsive means, means tending to operate the said affecting means and means preventing the operation thereof while the regulator is effective and permitting operation thereof at times while the regulator is ineffective.

89. The combination with a generator and a regulator therefor comprehending electro-responsive operating means, of means for affecting the operation of said responsive means and means preventing the operation of said affecting means while the generator output is above a predetermined value.

90. The combination with a generator and a regulator therefor comprehending electro-responsive operating means, of means for affecting the operation of said responsive means including a coil, and means for controlling the energization of said coil operating only when the regulator is ineffective.

91. The combination with a generator and a regulator comprehending voltage responsive operating means, of means for affecting the voltage operation of said regulator, means tending to operate the said means and means preventing the operation thereof while the regulator is effective.

92. The combination with a generator and a regulator comprehending voltage responsive operating means, of means for affecting the voltage operation of said regulator, means tending to operate the said means, and means preventing the operation thereof while the regulator is effective and permitting operation thereof at times while the regulator is ineffective.

93. The combination with a generator and a regulator therefor comprehending voltage responsive operating means, of means for affecting the voltage operation of said regulator, and means preventing the operation of said last-named means while the generator output is above a predetermined value.

94. The combination with a generator and a regulator therefor comprehending voltage responsive operating means, of means for affecting the voltage operation of said regulator including a coil, and means for controlling the energization of said coil operating only when the regulator is ineffective.

95. The combination with a generator and a storage battery adapted to be charged thereby, a regulator for the generator including responsive means affected by current supplied to the battery, means capable of nullifying the responsiveness of said means with respect to battery current, and means dependent upon the state of charge of said battery for operating said nullifying means.

JOHN L. CREVELING.